(12) United States Patent
Minamiura et al.

(10) Patent No.: US 12,537,144 B2
(45) Date of Patent: Jan. 27, 2026

(54) ELECTROLYTIC CAPACITOR INCLUDING POROUS ANODE BODY

(71) Applicant: Panasonic Intellectual Property Management Co., Ltd., Osaka (JP)

(72) Inventors: Takeshi Minamiura, Osaka Fu (JP); Masayuki Hogiri, Osaka Fu (JP); Norihiko Ogata, Saga Ken (JP); Kazuhide Gotou, Saga Ken (JP); Yuma Yano, Saga Ken (JP); Yukiyasu Sugihara, Aichi Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 18/549,507

(22) PCT Filed: Mar. 10, 2022

(86) PCT No.: PCT/JP2022/010668
§ 371 (c)(1),
(2) Date: Sep. 7, 2023

(87) PCT Pub. No.: WO2022/191291
PCT Pub. Date: Sep. 15, 2022

(65) Prior Publication Data
US 2024/0153713 A1     May 9, 2024

(30) Foreign Application Priority Data
Mar. 12, 2021   (JP) ................. 2021-040641

(51) Int. Cl.
*H01G 9/052*   (2006.01)
*H01G 9/15*    (2006.01)

(52) U.S. Cl.
CPC .............. *H01G 9/052* (2013.01); *H01G 9/15* (2013.01)

(58) Field of Classification Search
CPC .......... H01G 9/052; H01G 9/15; H01G 9/048; H01G 9/055; H01G 9/07
See application file for complete search history.

(56) References Cited

U.S. PATENT DOCUMENTS 3,818,286 A * 6/1974 Ganz .................. H01G 9/052
                                                      361/529
4,517,626 A * 5/1985 Allen .................. H01G 9/008
                                                      29/25.03
(Continued)

FOREIGN PATENT DOCUMENTS

JP   H06-224091 A   8/1994
JP   H07-022291 A   1/1995
(Continued)

OTHER PUBLICATIONS

International Search Report dated Jun. 7, 2022 issued in International Patent Application No. PCT/JP2022/010668, with English translation.

*Primary Examiner* — Timothy J. Dole
*Assistant Examiner* — Daniel M Dubuisson
(74) *Attorney, Agent, or Firm* — Rimon P.C.

(57) ABSTRACT

An electrolytic capacitor including a capacitor element that includes an anode body being porous and including an anode substrate body and a dielectric layer formed on a surface of the anode substrate body, and a solid electrolyte layer covering at least part of the dielectric layer. The anode body has a plurality of principal faces. A surface of the anode body has a first region and a second region different from the first region, and the first region does not include a corner portion where a plurality of the principal faces meet. A surface (Continued)

roughness in the first region is greater than a surface roughness in the second region.

7 Claims, 3 Drawing Sheets

(56) References Cited

U.S. PATENT DOCUMENTS

| | | | | |
|---|---|---|---|---|
| 5,667,536 A | * | 9/1997 | Hasegawa | H01G 9/15 |
| | | | | 29/25.03 |
| 2008/0239631 A1 | * | 10/2008 | Fujita | H01G 9/15 |
| | | | | 29/25.42 |
| 2008/0299371 A1 | * | 12/2008 | Poltorak | H01G 9/15 |
| | | | | 428/220 |
| 2013/0182375 A1 | * | 7/2013 | Naito | H01G 9/0029 |
| | | | | 205/171 |
| 2017/0330692 A1 | * | 11/2017 | Tochio | H01G 9/15 |

FOREIGN PATENT DOCUMENTS

| | | | | |
|---|---|---|---|---|
| JP | 2004146623 A | * | 5/2004 | |
| JP | 2009-182157 A | | 8/2009 | |
| JP | 2010165701 A | * | 7/2010 | |

* cited by examiner

FIG. 3

ELECTROLYTIC CAPACITOR INCLUDING POROUS ANODE BODY

CROSS-REFERENCE OF RELATED APPLICATIONS

This application is the U.S. National Phase under 35 U.S.C. § 371 of International Patent Application No. PCT/JP2022/010668, filed on Mar. 10, 2022, which in turn claims the benefit of Japanese Patent Application No. 2021-040641, filed on Mar. 12, 2021, the entire disclosures of which applications are incorporated by reference herein.

TECHNICAL FIELD

The present invention relates to an electrolytic capacitor.

BACKGROUND ART

Electrolytic capacitors, which have low equivalent series resistance (ESR) and excellent frequency characteristics, are incorporated in various electronic devices. An electrolytic capacitor usually includes a capacitor element including an anode section and a cathode section. The anode section includes an anode body being porous, and a dielectric layer is formed at the surface of the anode body. The dielectric layer contacts an electrolyte. An electrolytic capacity including a solid electrolyte, such as conductive polymer, as an electrolyte is known (e.g., Patent Literature 1).

CITATION LIST

Patent Literature

Patent Literature 1: Japanese Laid-Open Patent Publication No. 2009-182157

SUMMARY OF INVENTION

Technical Problem

The reliability of an electrolytic capacitor including a solid electrolyte is to be improved.

Solution to Problem

One aspect of the present invention relates an electrolytic capacitor, including: a capacitor element including an anode body being porous and including an anode substrate body and a dielectric layer formed on a surface of the anode substrate body, and a solid electrolyte layer covering at least part of the dielectric layer, wherein the anode body has a plurality of principal faces, a surface of the anode body has a first region and a second region different from the first region, the first region does not include a corner portion where a plurality of the principal faces meet, and a surface roughness Ra1 in the first region is greater than a surface roughness Ra2 in the second region.

Advantageous Effects of Invention

The increase in leakage current of the electrolytic capacitor can be suppressed, leading to improved reliability.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

[Electrolytic Capacitor]

An electrolytic capacitor according to one embodiment of the present disclosure includes a capacitor element including: an anode body being porous and including an anode substrate body and a dielectric layer formed on a surface of the anode substrate body; and a solid electrolyte layer covering at least part of the dielectric layer. The anode body has a plurality of principal faces. A surface of the anode body has a first region not including a corner portion, and a second region different from the first region. A surface roughness Ra1 in the first region is greater than a surface roughness Ra2 in the second region.

Here, the surface roughness Ra1 and Ra2 are an arithmetic mean roughness Ra defined in JIS B 0601:2013, which is determined, for example, by calculating from a curve obtained by measuring a roughness curve with a non-contact surface roughness meter using laser irradiation. The surface roughness Ra on the surface of the anode body is determined, with respect to a capacitor element (see FIG. 2) taken out from a disassembled electrolytic capacitor after fabrication, by removing the solid electrolyte layer by dissolving it in fuming nitric acid, followed by drying, to expose a surface of the anode body.

Usually, the anode body has a shape of a rectangular parallelepiped. In this case, the plurality of principal faces refer to respective faces of the rectangular parallelepiped. The surfaces of the anode body include the surfaces of these principal faces, and the surfaces of side portions and vertex portions connecting these principal faces to each other. The side portion refers to a region including a side where two principal faces of the anode body meet, and a vicinity thereof. The vertex portion refers to a region including a vertex where three principal faces of the anode body meet, and a vicinity thereof. Here, the side portion and the vertex portion are collectively referred to as a "corner portion". More specifically, the "corner portion" of the anode body refers to a region within 0.1 mm from a side where two principal faces of the anode body meet or a vertex where three principal faces meet. Furthermore, as will be described later, when the side portion and/or the vertex portion have a curved surface shape or a chamfered shape, the portion having a curved surface shape or a chamfered shape is included in the corner portion.

In short, the first region not including the corner portion means that the first region is more than 0.1 mm away from the aforementioned sides and the aforementioned vertices of the anode body, and does not have a curved surface shape or a chamfered shape.

The dielectric layer is usually formed by subjecting an anode substrate to a chemical conversion treatment, to oxidize the surface of the anode substrate. Therefore, the properties of the dielectric layer formed by chemical conversion are affected by the surface condition of the anode substrate before chemical conversion treatment.

The anode substrate before chemical conversion treatment can be produced by, for example, placing and compacting metal powder in a mold, followed by sintering. In this case, metal fine particles are exposed on the principal faces of the anode substrate, and when viewed microscopically, the surfaces are not flat and are highly rough, and tend to have a shape having unevenness. Especially at the side portion and the vertex portion respectively connecting two principal faces and three or more principal faces to each other in the anode substrate, when viewed microscopically, the surfaces of the anode substrate are not flat and are highly rough, and tend to have a shape of having unevenness. When the dielectric layer is grown in this state by a chemical conversion treatment, a defect tends to occur at the uneven portion in the dielectric layer. When a defect occurs in the dielectric layer, a channel is formed through which an electric current flows between the solid electrolyte and a valve metal via the defect portion, and the leakage current may increase.

Moreover, the anode body after chemical conversion treatment, which has an outer shape that reflects the outer shape of the anode substrate before chemical conversion treatment, is porous, and therefore, is brittle and apt to collapse. Especially at the corner portions of the anode body, the mechanical strength is low as compared to the portions other than the corner portions, and the thermal stress tends to concentrate thereon. When the porous portion is damaged, the dielectric layer covering the porous portion may also be damaged. Due to the damage to the dielectric layer, the leakage current may increase.

On the other hand, by making compact the surface layers of the principal faces of the anode substrate before chemical conversion treatment, the defects during chemical conversion in the dielectric layer that may occur when the dielectric layer is formed by chemical conversion treatment can be reduced. As a result, the leakage current can be reduced. Also, the mechanical strength of the dielectric layer can be enhanced. This can suppress the damage to the dielectric layer after chemical conversion. As a result, the increase in leakage current can be suppressed. The surface layers of the principal faces of the anode substrate can be made compact, for example, by laser irradiation or, as described later, placing the anode substrate before forming a dielectric layer thereon in a container together with a vibration member such as media particles before sintering, and vibrating the container. The vibration allows the principal faces of the anode substrate to collide with the vibration member, and thus, the surface layer portions of the principal faces are compressed by the collision and made more compact than the inside. In this case, the surface roughness on the surfaces of the principal faces made compact is smaller than that on the surfaces before the compactification treatment.

However, in the case of making compact the surface layers of the principal faces of the anode substrate, accompanied with the increase of the area of the compacted surface, the leakage current may be conversely increased, or the expected leakage current reduction effect may fail to be achieved. As a reason for this it is considered that, during sintering, the binder component contained in the anode substrate is incinerated and discharged as a gas to the outside; however, when the surface of the anode substrate before sintering is compactified and has a reduced porosity, the discharge of the binder component is inhibited. The binder component that is not discharged remains as a carbon residue in the anode body. Since the carbon residue has electrical conductivity, due to concentration of electric current on the carbon residue during the formation of an anodized film through chemical conversion treatment, the oxide film may be overheated. This results in degraded properties of the dielectric layer, which is considered as one of the factors to increase the leakage current.

In light of the above, in the electrolytic capacitor of the present embodiment, the anode substrate is provided with a region (second region) in which the surface layer of the anode substrate is compactified and a region (first region) in which the compactification of the surface layer of the anode substrate is intentionally restricted. As a result, on the anode body after chemical conversion, the second region where the surface layer of the anode body is made compact and the first region where the surface layer of the anode body is made less compact than the second region appear. The second region is more compact and less porous than the first region. Also, the surface roughness Ra1 in the first region is greater than the surface roughness Ra2 in the second region where the surface is compactified. The first region is provided in a region (e.g., a central portion of a principal face of the anode body) other than the corner portion of the anode body (anode substrate). The second region can include the corner portion.

The first region which is not compactified is present in the surface layer of the anode substrate. Therefore, the binder component is gasified and can be discharged to the outside through the first region during sintering, and the amount of the remaining carbon derived from the binder component can be reduced. On the other hand, the surface of the second region is made compact. Therefore, defects in the dielectric layer formed by chemical conversion are reduced, and the mechanical strength of the dielectric layer is enhanced, which can suppress the damage to the dielectric layer. By these effects, the leakage current can be effectively reduced.

Note that the second region being more compact than the first region means that a porosity $P_2$ in the surface layer of the second region is smaller than a porosity $P_1$ in the surface layer of the first region. The porosity is determined by image analysis of a cross-sectional photograph of the anode body. A cross section of the anode body is photographed with a scanning electron microscope (SEM), and an image processing such as binarization is performed on the photographed image in a field of view of, for example, 5 μm by 10 μm, to distinguish between pore portions and portions other than the pore portions. The porosity can be determined as a ratio of the area of the pore portions to the total area of the pore portions and the other portions. It is desirable to measure the photographed image at 10 random points, and determine the porosity as an average value of the area ratios of the above pore portions obtained at the 10 points.

The surface roughness Ra1 in the first region may be 1.1 times or more higher than the surface roughness Ra2 in the second region. When the Ra1 is 1.1 times or more higher than the Ra2, the second region is sufficiently compact, and a dielectric layer with few defects can be formed. Note that the Ra1 and the Ra2 are each an average of measured values at 10 or more random points in each region.

The surface roughness Ra1 in the first region may be 4 times or less higher than the surface roughness Ra2 in the second region. For example, when the anode substrate is vibrated together with media particles in a container, an anode body having the first region and the second region each having a surface roughness within such a range can be obtained.

The first region is provided on the surface of at least one of the plurality of principal faces of the anode body. The first region is a region within one principal face of the anode body, and can be a region that is some distance away from the corner portions of the anode body. The position of the center of one principal face of the anode body is denoted by O. The center position O is a position of the center of gravity obtained from the shape of the contour line constituting the boundary of one principal face of the anode body. Of the distances from the center position O to the respective plurality of side portions constituting the boundary (contour line) of one principal face of the anode body, the maximum distance is denoted by Dm. The first region may be a region at a distance of Dm/2 or less from the center position O. For example, when one principal face of the anode body has a rectangular contour, the first region can be a region being at a distance of one-fourth or less of the long side of the rectangle from the center position O and not including the corner portion.

The second region may include a region X within the principal face that has the first region. In that case, the surface roughness Ra2 in the second region X within the principal face that has the first region is smaller than the surface roughness Ra1 in the first region. That is, one principal face of the anode body may have both the second region X having a compacted surface layer with a small surface roughness, and the first region having a larger surface roughness than the second region X. The second region X may be a region being within the principal face that has the first region, and being a part of the region other than the first region (excluding the corner portions).

An area A1 of the first region is, for example, 0.1% to 20% of the total area of the plurality of principal faces of the anode body. When the area A1 of the first region is 0.1% or more of the total area of the plurality of principal faces, the binder component can be discharged outside through the first region during sintering, and the amount of residual carbon can be reduced. On the other hand, with increasing the area A1 of the first region, the area of the principal faces other than the first region decreases, and the area A2 of the second region in which the surface layer of the anode body is made compact decreases. When the area A1 of the first region is 20% or less of the total area of the plurality of principal faces, the second region having a sufficiently large area can be disposed in the remaining region, and the effect of reducing the defects in the dielectric layer formed by chemical conversion and suppressing damage to the dielectric layer can be sufficiently obtained.

The second region may or may not include the corner portion, but more preferably includes the corner portion. That is, preferably, the corner portions of the anode body are compactified. The corner portions are low in mechanical strength, at which damage to the dielectric layer tends to occur. However, when the corner portions are compactified, the mechanical strength of the dielectric layer can be increased, and damage to the dielectric layer can be suppressed.

At least part of the corner portion of the anode body may have a curved surface shape or a chamfered shape. When at least part of the corner portion has a curved surface or is chamfered, the damage to the dielectric layer at the corner portion can be suppressed, and an electrolytic capacitor with small leakage current can be realized. Therefore, the reliability of the electrolytic capacitor can be improved. It is more preferable when the corner portion of the anode body having a curved surface shape or a chamfered shape is compactified.

That at least part of the corner portion has a curved surface shape is not limited to when the cross-sectional shape of the corner portion is a curved line. For example, the cross-sectional shape of the corner portion may be a polygonal line with a plurality of obtuse angles. When the cross-sectional shape is a convex shape, and in the cross-sectional shape, a straight line corresponding to one principal face and a straight line corresponding to a principal face adjacent thereto are connected via at least one straight line and/or curve line, it can be said that the corner has a curved surface shape or a chamfered shape. In other words, the corner portion having a curved surface shape or a chamfered shape also means that the cross-sectional shape of the corner portion taken perpendicular to the adjacent two principal faces has no sharp-angled region of 90° or less.

A solid electrolyte layer is formed so as to cover the dielectric layer. When the anode body has no curved surface at the corner portions, the solid electrolyte layer tends to be formed thin at the corner portions. Especially when the solid electrolyte layer contains a conductive polymer and is formed by chemical polymerization of the conductive polymer, the thickness of the solid electrolyte layer tends to be thin at the corner portions. However, by shaping at least part of the corner portions into a curved surface, the thinning of the solid electrolyte layer at the corner portions can be suppressed, and the solid electrolyte layer can be formed in a uniform thickness. As a result, the electrolytic capacitor can be strong against the stress from outside, and the increase in leakage current and the occurrence of short-circuiting can be suppressed. Also, the withstand voltage is improved.

The compactification of the surface layer of the anode body can be achieved by, for example, before sintering or after sintering, placing the anode substrate before forming a dielectric layer thereon in a container together with a vibration member such as media particles, and vibrating the container, as described later. The vibration allows the principal faces of the anode substrate to collide with the vibration member, so that the surface layer portions of the principal faces are compressed by collision and made more compact than the inside.

At this time, the vibration member collides not only with the principal faces of the anode substrate but also with the corner portions. The corner portions, which are low in mechanical strength, are readily compressed by collision. Therefore, the corner portions can be compressed by collision and can be formed into a curved surface shape. As a result, the compactness at the surface layers of the corner portions becomes higher (porosity becomes lower) than at the surface layers of the principal faces and the inside.

For providing a region (first region) where compactification is restricted, in a part of the principal face of the anode substrate, for example, a member that absorbs impact is attached to a region of part of the principal face of the anode substrate by bonding or other methods, and then, the anode substrate with the impact absorbing member attached thereto is vibrated, together with the vibration member. The surface layer of the anode substrate in the region where the impact absorbing member is attached is hardly compressed by the collision with the vibration member, and thus, the degree of compactification becomes small and the surface roughness becomes high, as compared to in the region without the impact absorbing member attached thereto.

The electrolytic capacitor may further include an anode wire standing upright from one principal face of the anode body. The anode wire is electrically connected with an anode terminal of the electrolytic capacitor, and via the anode wire, the anode body is electrically connected with the anode terminal. In that case, the first region may be a region in one principal face of the anode body from which the anode wire stands upright (implant face).

The implant face from which the anode wire stands upright has, during sintering, an air space around the wire, to prevent the implant face from being sealed in close contact with other elements and the sintering tray. Therefore, the gas inside the anode body is likely to escape from a peripheral portion around the anode wire to the outside of the anode body. In addition, since the wire has a flat curved surface, the route length of a gas discharge route formed of the gaps between the wire surface and the particles becomes shorter at some places than that in the porous portion formed of the gaps between the particles, and a larger amount of gas tends to be discharged along the anode wire. Therefore, by providing a non-compactified first region around the anode wire within the implant face so that the gas passage is not blocked, the gas derived from the binder component can be efficiently discharged during sintering, and the amount of the carbon residue can be reduced. As a result, the increase in leakage current is suppressed, and a highly reliable electrolytic capacitor can be obtained.

In addition, the principal faces of the anode body (anode substrate) other than the implant face tend to be blocked by other anode substrates or the sintering tray during sintering. Therefore, if the first region is provided in the principal face of the anode body (anode substrate) other than the implant face, the first region may be blocked by other anode substrates or the sintering tray, and fail to function as a gas discharge path for discharging the gas derived from the binder component. On the other hand, when the first region is provided in the implant face, the anode wire plays a role of securing the air space, so that the first region provided in the implant face is hardly blocked by other anode substrates or the sintering tray, and can function suitably as a discharge path for discharging the gas derived from the binder component.

When the anode substrate to which the anode wire is attached is placed in a container together with a vibration member, and the container is vibrated, at a peripheral region around the anode wire within the implant face, the anode wire serves as a steric obstacle and the vibration member hardly collides with the anode substrate, and the surface layer of the peripheral region around the anode wire within the implant face is hardly compactified by compression. Therefore, without separately attaching an impact absorbing member to the principal face of the anode substrate, the first region can be formed at the peripheral region around the anode wire within the implant face. In this case, the size of the first region can be regulated by the size of the vibration member (media particles).

With regard to the first region, within the implant face, the maximum value of a distance from the anode wire in the first region is desirably 0.2 mm or more, more preferably 0.25 mm or more. In this case, the amount of the carbon residue remaining in the anode body is likely to be reduced, and the effect of suppressing the increase in leakage current of the electrolytic capacitor is enhanced.

Figure 1:
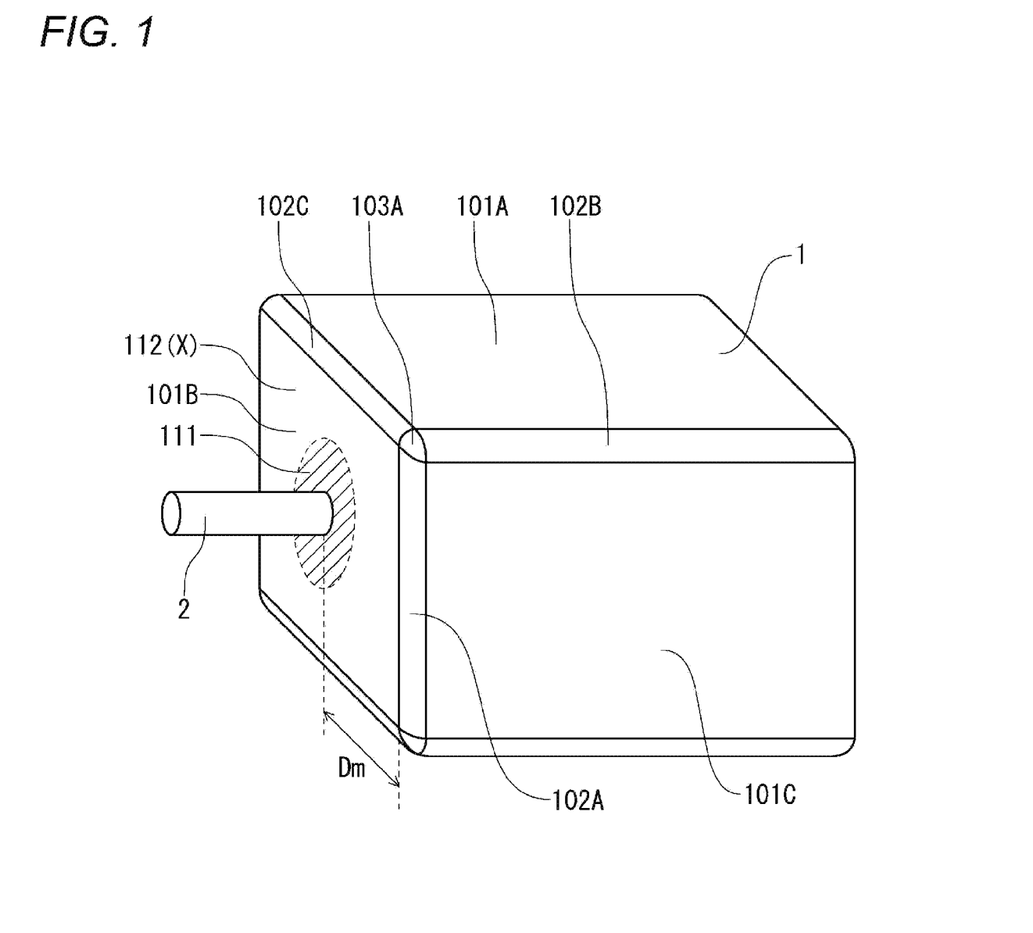
FIG. 1 A schematic oblique view illustrating the shape of an anode body used for an electrolytic capacitor according to an embodiment of the present disclosure.

FIG. 1 is a schematic oblique view illustrating an example of an anode body (or an anode substrate) used for an electrolytic capacitor of the present embodiment. As illustrated in FIG. 1, an anode body 1 has a shape of an approximate rectangular parallelepiped, and six principal faces 101A to 101F are exposed. Note that 101D to 101F are at hidden positions and not shown.

With respect to the principal faces 101A to 101F, in the vicinity of a side where adjacent two principal faces meet, a connection face may be formed by reducing the sharpness at the side portion. In the illustrated example in FIG. 1, a connection face 102C is between the principal faces 101A and 101B, a connection face 102A is between the principal faces 101B and 101C, and a connection face 102B is between the principal faces 101C and 101A. In the vicinity of a vertex where three principal faces meet, a second connection face is formed by reducing the sharpness at the vertex portion. The illustrated example in FIG. 1 has a second connection face 103A at the vertex portion where the principal faces 101A to 101C meet. The second connection face 103A connects the connection faces 102A to 102C with each other. The connection faces 102A to 102C and the second connection face 103A are processed into a rounded curved surface. The connection faces 102A to 102C and the second connection face 103A may be a curved surface, and may be constituted of one or more flat surfaces (e.g., by chamfering the corner portions).

Note that, although FIG. 1 illustrates an example of the shape of the anode body, the anode substrate before subjected to a chemical conversion treatment also has a shape of an approximate rectangular parallelepiped, six principal faces 101A to 101F are exposed, and the side portions and the vertex portions connecting principal surfaces to each other are processed into rounded curved surfaces by reducing the sharpness thereof.

An anode wire 2 stands upright from the center position of the principal face 101B of the anode body 1. The anode body 1 and the anode wire 2 constitute an anode section 6 of the electrolytic capacitor.

In the principal face 101B, a first region 111 is provided in a circular region with its center at an implant position of the anode wire 2. The surfaces of the anode body 1 excluding the first region (including the principal face 101A, the principal face 101B (excluding the first region 111), the principal faces 101C to 101F, the connection faces 102A to 102C, and the second connection face 103A) are a second region 112 and have a smaller surface roughness than the first region 111.

The principal faces 101A and 101C to 101F as the second region 112 each have a surface layer made more compact than the inside. The surface roughness Ra2 on each of these principal faces is smaller than the surface roughness Ra1 in the first region 111. That is, the surfaces of the principal faces 101A and 101C to 101F have less unevenness than the surface of the first region 111 provided in the principal face 101B, and the mechanical strength of the anode substrate and the anode body is enhanced. Thus, a dielectric layer with few defects can be formed on the surface of the anode body 1. As a result, the leakage current can be reduced. Furthermore, the damage to the dielectric layer is suppressed, the increase in leakage current due to damage to the dielectric layer is suppressed, and the leakage current can be maintained small.

The principal face 101B has the first region 111 and the second region 112. In the principal face 101B, like in the principal faces 101A and 101C to 101F, the second region 112 has a surface layer made more compact than the inside, has little unevenness, and the mechanical strength of the anode substrate and the anode body is enhanced. Thus, a dielectric layer with few defects can be formed on the surface of the anode body 1, and the leakage current can be reduced. Furthermore, the effect of suppressing the increase in leakage current due to damage to the dielectric layer can be exerted, and the leakage current can be maintained small.

On the other hand, in the first region 111 provided within the principal face 101B, the compactness at the surface layer is almost the same as or slightly higher than that of the inside of the anode body, and is smaller than the compactness in the second region 112, and minor unevenness is present. The surface roughness Ra1 in the first region 111 is greater than the surface roughness Ra2 in the second region 112 within the principal face 101B. Therefore, with respect to the dielectric layer formed on the first region 111, the effect of reducing the defects in the dielectric layer and the effect of suppressing the increase in leakage current due to damage to the dielectric layer are hardly exerted. With the first region, however, the gas derived from the binder component generated during sintering can be readily discharged through the first region having a large porosity. Thus, the amount of the carbon residue remaining in the anode body is reduced, which contributes to suppressing the increase in leakage current. Consequently, by arranging the first region and the second region in an appropriately balanced manner, it is possible to effectively suppress the increase in leakage current of the electrolytic capacitor.

The first region 111, with its center at the implant position of the anode wire, can be formed in a region within a certain distance from the center. More specifically, for example, the first region 111 can be a region at a distance of Dm/2 or less from the center, where Dm is either a distance of the connection face 102A from the implant position of the anode wire or a distance of the connection face 102C from the implant position of the anode wire, whichever is longer (i.e., half the length of the long side of the rectangular principal face 101B). In this case, when the short side of the rectangular principal face 101B is one-half or more of the length of the long side, the first region 111 can be formed in a circular shape or a ring shape.

Due to the presence of the connection faces 102A to 102C and/or the second connection face 103A, the anode body (anode substrate) has an outer shape with the corner portions chamfered or processed into a curved surface. Therefore, a dielectric layer with few defects can be formed even at the corner portions, and the effect of reducing the leakage current can be enhanced. Furthermore, the mechanical strength of the corner portions of the anode body, which are fragile and susceptible to break, is increased, and the concentration of thermal stress is alleviated. This can further enhance the effect of suppressing the increase in leakage current due to damage to the dielectric layer, and further maintain the leakage current small.

The surface layers of the connection faces 102A to 102C and/or the second connection face 103A as the second region may be made more compact than the surface layers of the principal faces 101A to 101F as the second region. The surface roughness on the surfaces of the connection faces 102A to 102C and/or the second connection face 103A as the second region is greater than the surface roughness on the surface of the first region 111, and may be greater than the surface roughness on the principal face 101A to 101F as the second region.

In the example of FIG. 1, the entire surfaces of the principal faces 101A and 101C to 101F are the second region 112, and are formed to have a smaller surface roughness than the first region 111 provided in the principal face 101B. However, in a region of at least part of the surface of the principal faces 101A and 101C to 101F, the first region 111 may be provided where the compactification of the surface layer is restricted and the surface roughness is high. The arrangement of the first region and the second region on the surface of the anode body (anode substrate) is not limited to the configuration shown in FIG. 1.

Figure 2:
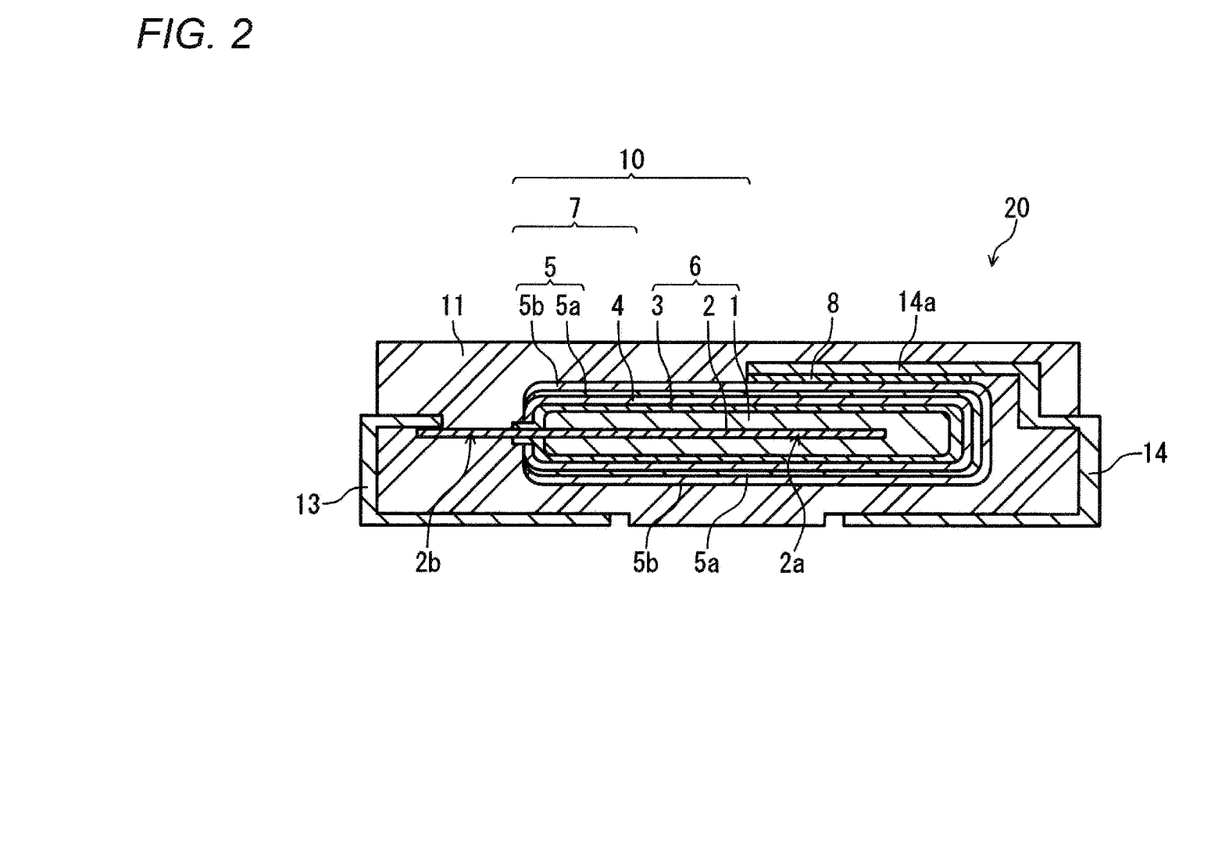
FIG. 2 A schematic cross-sectional view of an electrolytic capacitor according to an embodiment of the present disclosure.

A description will be given below of a configuration of an electrolytic capacitor according to the present embodiment, with reference to the drawings as appropriate. The present invention, however, is not limited thereto. FIG. 2 is a schematic cross-sectional view of an electrolytic capacitor according to the present embodiment.

An electrolytic capacitor 20 includes a capacitor element 10 having an anode section 6 and a cathode section 7, a package body 11 encapsulating the capacitor element 10, an anode lead terminal 13 electrically connected to the anode section 6 and partially exposed from the package body 11, and a cathode lead terminal 14 electrically connected to the cathode section 7 and partially exposed from the package body 11. The anode section 6 has an anode body 1 and an anode wire 2. The anode body 1 includes a dielectric layer 3 formed at the surface thereof. The cathode section 7 has a solid electrolyte layer 4 covering at least part of the dielectric layer 3, and a cathode layer 5 covering the surface of the solid electrolyte layer 4.

(Capacitor Element)

The capacitor element 10 will be specifically described below, with reference to an example in which a solid electrolyte layer is included as an electrolyte.

The anode section 6 has the anode body 1 and the anode wire 2 extending from one face of the anode body 1 and electrically connected to the anode lead terminal 13.

The anode body 1 is, for example, a porous sintered body in the shape of a rectangular parallelepiped obtained by sintering metal particles. As the metal particles, particles of a valve metal, such as titanium (Ti), tantalum (Ta), and niobium (Nb), are used. For the anode body 1, one or more kinds of metal particles are used. The metal particles may be of an alloy of two or more kinds of metals. For example, an alloy containing a valve metal and a metal, such as silicon, vanadium, or boron, can be used. A compound containing a valve metal and a typical element, such as nitrogen, may be used. The alloy of a valve metal is mainly composed of the valve metal, and contains the valve metal in an amount of, for example, 50 atom % or more.

The anode wire 2 is constituted of an electrically conductive material. The material of the anode wire 2 is not particularly limited, and may be, for example, the valve metal as described above, copper, aluminum, an aluminum alloy, and the like. The materials constituting the anode body 1 and the anode wire 2 may be of the same kind or different kinds. The anode wire 2 has a first portion 2a implanted into the anode body 1 from one face of the anode body 1, and a second portion 2b extended outward from the above one face of the anode body 1. The anode wire 2 may have any cross sectional shape, such as a circular shape, a track shape (a shape composed of straight lines parallel to each other and two curved lines connecting the ends of the straight lines), an elliptical shape, a rectangular shape, and a polygonal shape.

The anode section 6 can be formed by, for example, with the first portion 2a implanted in a powder of the metal particles as described above, pressure-molding the powder into a rectangular parallelepiped-like shape, followed by sintering. Thus, the second portion 2b of the anode wire 2 is drawn out so as to stand upright from one face of the anode body 1. The second portion 2b is joined to the anode lead terminal 13 by welding or the like, providing electrical connection between the anode wire 2 and the anode lead terminal 13. The method of welding is not particularly limited, and may be, for example, resistance welding, laser welding, and the like. This may be followed by a processing of forming a curved surface at the corner portions of the rectangular parallelepiped.

The anode body 1 has the dielectric layer 3 formed at the surface thereof. The dielectric layer 3 is constituted of, for example, a metal oxide. A method of forming a layer containing a metal oxide at the surface of the anode body 1 is exemplified by a method of immersing the anode body 1 in a chemical conversion solution, thereby to anodize the surface of the anode body 1, and a method of heating the anode body 1 in an atmosphere containing oxygen. The dielectric layer 3 is not limited to the above layer containing a metal oxide, and may be any layer that has electrical insulating properties.

A surface of the anode body 1 has a first region and a second region differing in the surface roughness. The surface roughness Ra1 in the first region is greater than the surface roughness Ra2 in the second region. In the second region, the surface layer of the anode body 1 is compressed, so that the compactness is high (the porosity is low) in the surface layer. On the other hand, in the first region, the surface layer of the anode body 1 is not so much compressed as in the second region. The compactness (porosity) in the surface layer of the first region is approximately the same as the compactness (porosity) in the inside of the anode body 1, or is somewhere between the compactness (porosity) in the surface layer of the first region and the compactness (porosity) in the inside.

(Cathode Section)

The cathode section 7 has a solid electrolyte layer 4 and a cathode layer 5 covering the solid electrolyte layer 4. The solid electrolyte layer 4 is formed so as to cover at least part of the dielectric layer 3.

For the solid electrolyte layer 4, for example, a manganese compound or a conductive polymer is used. Examples of the conductive polymer include polypyrrole, polythiophene, polyfuran, polyaniline, and polyacetylene. These may be used singly or in combination of two or more kinds. The conductive polymer may be a copolymer of two or more kinds of monomers. In terms of their excellent conductivity, polythiophene, polyaniline, and polypyrrole may be used. In particular, in terms of its excellent water repellency, polypyrrole may be used.

The solid electrolyte layer 4 containing the above conductive polymer can be formed by, for example, polymerizing a raw material monomer on the dielectric layer 3. Alternatively, it can be formed by applying a liquid containing the above conductive polymer onto the dielectric layer 3. The solid electrolyte layer 4 is constituted of one layer or two or more layers of the solid electrolyte layer. When the solid electrolyte layer 4 is constituted of two or more layers, the compositions of the conductive polymer contained in respective layers, the forming methods (polymerization methods), and the like may be different from each other.

In the present specification, the polypyrrole, polythiophene, polyfuran, polyaniline, and the like respectively refer to polymers whose backbones are polypyrrole, polythiophene, polyfuran, polyaniline, and the like. Accordingly, the polypyrrole, polythiophene, polyfuran, polyaniline, and the like can include their derivatives. For example, the polythiophene includes poly(3,4-ethylenedioxythiophene).

In order to improve the electrical conductivity of the conductive polymer, various dopants may be added to a polymerization liquid for forming the conductive polymer, and a solution or a dispersion of the conductive polymer. Although not particularly limited, the dopant may be, for example, naphthalene sulfonic acid, p-toluenesulfonic acid, polystyrene sulfonic acid, and the like.

When the conductive polymer is dispersed in the form of particles in the dispersion medium, the average particle diameter D50 of the particles is, for example, 0.01 μm or more and 0.5 μm or less. When the average particle diameter D50 is in this range, the particles can easily enter into inside the anode body 1.

The cathode layer 5 includes, for example, a carbon layer 5a formed so as to cover the solid electrolyte layer 4, and a metal paste layer 5b formed on the surface of the carbon layer 5a. The carbon layer 5a contains a conductive carbon material, such as graphite, and a resin. The metal paste layer 5b contains, for example, metal particles (e.g., silver) and a resin. The configuration of the cathode layer 5 is not limited thereto. The cathode layer 5 may have any configuration that has an electric current collecting function.

(Anode Lead Terminal)

The anode lead terminal 13 is electrically connected to the anode body 1 via the second portion 2b of the anode wire 2. The material of the anode lead terminal 13 may be any material that is electrochemically and chemically stable and has electrical conductivity. The anode lead terminal 13 may be, for example, a metal, such as copper, or a non-metal. The shape is not particularly limited as long as it is a flat plate-like shape. In view of height reduction, the thickness of the anode lead terminal 13 (the distance between the principal faces of the anode lead terminal 13) may be 25 μm or more and 200 μm or less, and may be 25 μm or more and 100 μm or less.

One end of the anode lead terminal 13 may be joined to the anode wire 2 with a conductive adhesive or solder, or may be joined to the anode wire 2 by resistance welding or laser welding. The other end of the anode lead terminal 13 is guided outside the package body 11 and exposed from the package body 11. The conductive adhesive is, for example, a mixture of a thermosetting resin as described later and carbon or metal particles.

(Cathode Lead Terminal)

The cathode lead terminal 14 is electrically connected to the cathode section 7 at a joint portion 14a. The joint portion 14a is a portion where the cathode lead terminal 14 is overlapping with the cathode layer 5 when the cathode layer 5 and the cathode lead terminal 14 joined to the cathode layer 5 are viewed from a direction normal to the cathode layer 5.

The cathode lead terminal 14 is joined to the cathode layer 5 via, for example, an electrically conductive adhesive 8. One end of the cathode lead terminal 14 constitutes, for example, part of the joint portion 14a, and is disposed inside the package body 11. The other end of the cathode lead terminal 14 is guided outside. Therefore, part of the cathode lead terminal 14 including the other end is exposed from the package body 11.

The material of the cathode lead terminal 14 also may be any material that is electrochemically and chemically stable and has electrical conductivity. The cathode lead terminal 14 may be, for example, a metal, such as copper, or a non-metal. The shape thereof is also not particularly limited, and is, for example, a long and flat plate-like shape. In view of height reduction, the thickness of the cathode lead terminal 14 may be 25 μm or more and 200 μm or less, and may be 25 μm or more and 100 μm or less.

(Package Body)

The package body 11 is provided in order to electrically insulate the anode lead terminal 13 from the cathode lead terminal 14, and is constituted of an electrically insulating material (package body material). The package body material includes, for example, a thermosetting resin. Examples of the thermosetting resin include epoxy resin, phenol resin, silicone resin, melamine resin, urea resin, alkyd resin, polyurethane, polyimide, and unsaturated polyester.

[Production Method of Electrolytic Capacitor]

A description will be given below of an exemplary production method of an electrolytic capacitor according to the present embodiment.

The production method of an electrolytic capacitor is a method for producing a solid electrolytic capacitor that includes a capacitor element including: an anode body being porous, and including an anode substrate body and a dielectric layer formed on a surface of the anode substrate body; and a solid electrolyte layer covering at least part of the dielectric layer. The method includes steps of: preparing an anode substrate containing a bound product of metal powder; sintering the anode substrate; obtaining an anode body including an anode substrate body and a dielectric layer by applying a chemical conversion treatment to the anode substrate after sintering; and covering at least part of the dielectric layer with a solid electrolyte layer. The anode substrate has a plurality of principal faces. The anode substrate has a first region and a second region, in a region of at least part of one of the plurality of principal faces. The principal face on which the first region is disposed and the principal face on which the second region is disposed may be the same as or different from each other. The production method further includes a compactification step of increasing the density of at least the second region of the plurality of principal faces of the anode substrate. The compactification step is performed while restricting the increase in density of the first region.

(1) Preparation Step of Anode Substrate

First, an anode substrate serving a base material for producing an anode body 1 is prepared. As the anode substrate, a porous body can be used. In this case, valve metal particles and the anode wire 2 are placed in a mold such that the first portion 2a is embedded in the valve metal particles, and then pressure-molded. An anode substrate including a bound product of the valve metal particle is thus obtained. The pressure at the time of pressure molding is not particularly limited. The valve metal particles may be mixed, as needed, with a binder, such as polyacrylic carbonate.

The valve metal particles are usually pressure-molded using a mold having an internal space in the shape of a rectangular parallelepiped, and then, sintered. In this case, the anode substrate before sintering has a plurality of principal faces corresponding to the rectangular parallelepiped. The shape of the anode substrate after sintering is also a rectangular parallelepiped and has a plurality of principal faces. In this case, the plurality of principal faces are directly connected to each other, forming sides and vertices, and, usually, the corner portions, which are the side portions and/or vertex portions connecting the plurality of principal faces to each other, are pointed at their edges and have no curved surface.

With respect to the anode substrate after pressure molding, compactification (densification) of the principal faces of the anode substrate can be performed. In the compactification step, for example, compactification (densification) in the second region of the principal faces is performed by allowing media particles to collide with the principal faces of the anode substrate. Preferably, the compactification may be performed by vibrating the anode substrate together with media particles. More specifically, the compactification can be performed by placing the anode substrate together with media particles on a container or a pedestal, and vibrating the container or the pedestal vertically and/or laterally. Along with the vibration of the container or the base, the anode substrate and the media particles vibrate, facilitating the collision between the anode substrate and the media particles. Due to the collision of the media particles with the principal faces of the anode substrate, the surface layers of the principal faces of the anode substrate are compressed, and formed with high density.

The media particles, in addition to colliding with the principal faces of the anode substrate, can also collide with the corner portions (side portions and vertex portions) connecting the principal faces of the anode substrate. As a result, in addition to the principal faces of the anode substrate, the corner portions are compressed into a curved surface, and at least part of the corner portions are formed with higher density than the compactified region of the principal faces. On the other hand, since the media particles hardly collide with the region around the anode wire 2 within the principal face from which the anode wire 2 stands upright, the surface layer of the anode substrate is hardly compressed around the anode wire 2, so that a first region with low density is formed around the anode wire 2. With an impact absorbing member attached thereto, the media particles may be allowed to collide with the principal face of the anode substrate, so that the first region which is less dense than the second region is formed in the region where the impact absorbing member is attached.

The pedestal (or bottom of the container) may be a sieve. The sieve has a moderately small coefficient of static friction and is likely to induce the movement of media particles and the collision of the media particles with the anode substrate. As a result of colliding with the media particles, the surface layers of the anode substrate are compressed in most part. When the pedestal is a sieve, the anode wire is less likely to collide directly with the pedestal, which can reduce the risk that the anode wire is bent. The mesh size of the sieve is less than the minimum external dimensions of the anode substrate so that the anode substrate will not fall through the openings of the sieve. The mesh size of the sieve may be 1 mm or more, and may be 2 mm or more and 3.4 mm or less. When the mesh size is 1 mm or more, the variation in curvature at the corner portions can be likely reduced to a certain value or less.

With the anode substrate placed on media particles, the anode body may be vibrated together with the media particles by applying an external force to the media particles. More specifically, for example, after the anode substrate is mixed with the media particles, the anode substrate is put into a shaker together with the media particles, and the shaker is operated. The shaker is preferably capable of applying vibration in the vertical direction as well as in the horizontal direction.

The density of the media particles may be 0.15 to 0.4 times the density (true density) of the anode substrate. When the density of the media particles is within the above range, the energy associated with the collision of the media particles can be efficiently used for compressive deformation of the anode substrate.

As the media particles, alumina particles, zirconia particles, and the like can be used. The particle diameter (average particle diameter) of the media particles may be one-third or less of a maximum dimension of the anode body, and may be one-fifth or less thereof. In this case, the media particles are more likely to collide with the principal faces of the anode substrate than with the corner portions, and the principal faces of the anode substrate are likely to be uniformly compressed by the collision. The maximum dimensions of the anode body refer to the maximum Feret's diameters of the anode body excluding the anode wire, and when the anode body is a rectangular parallelepiped in shape, it refers to the length of the longest side. The particle size (average particle diameter) of the media particles is, for example, 0.1 mm to 3 mm, and may be 0.5 mm to 2 mm.

In the case of using alumina particles as the media particles, when the anode substrate is constituted of a valve metal other than aluminum (e.g., tantalum), due to the collision of the media particles with the anode substrate, alumina derived from the media particles may adhere in a very small amount to the anode substrate. When the anode substrate with alumina deposited thereon is subjected to a chemical conversion treatment, the anode body can include a dielectric layer containing aluminum oxide. The aluminum oxide contained in the dielectric layer, if its amount is very small, can improve the insulating properties of the dielectric layer and acts to improve the withstand voltage and reduce the leakage current. However, an excess amount of the aluminum oxide contained in the dielectric layer may cause a decrease in capacitance due to the presence of a plurality of materials differing in dielectric constant. The amount of alumina adhering to the anode substrate can be controlled appropriately by the frequency of vibration, the particle diameter of the media particles, the mixing ratio of the anode substrate and the media particles put into the container, the duration of collision with media particles, and others.

At least part of the surfaces of the media particles may be coated in advance with the same metal as the constituent metal of the metal powder of the anode substrate. Here, the constituent metal means a major component, rather than an impurity contained in the anode substrate. Thus, when the media particles collide with the anode substrate, a metal (or metal compound) other than the valve metal constituting the anode body is unlikely to adhere onto the anode substrate. For example, in the case of using alumina particles as the media particles, the adhesion of alumina onto the surface of the anode substrate is suppressed. For coating the surfaces of media particles, any known method can be used. However, when the media particles (e.g., alumina particles) collide with the anode substrate, alumina derived from the media particles will adhere onto the anode substrate, and on the other hand, the constituent metal of the anode substrate will adhere onto the surfaces of the media particles. Consequently, the surfaces of the media particles will be coated with the same metal as the constituent metal of the anode substrate. The media particles whose surfaces are coated in this way with the same metal as the constituent metal of the anode substrate may be used.

As described above, with the method of vibrating the anode substrate together with media particles and allowing the anode substrate to collide with the media particles, it is possible to efficiently compress the surface layers of the principal faces of the anode substrate, and efficiently compactify the principal faces. The method for making compact the surface layers of the anode substrate is not limited thereto, and includes, for example, a method of allowing the anode substrates to collied with each other, a method of feeding the anode substrate and media particles into a rotating barrel, and a method of laser processing.

In an anode substrate obtained by pressure-molding metal powder, regardless of whether it is before or after sintering, the principal faces of the anode substrate have fine metal particles adhering thereto, and in many cases, when viewed microscopically, they are not flat but have a shape having unevenness. However, the fine metal particles adhering to the principal faces do not contribute to the capacitance because, during the formation of a dielectric layer, the dielectric layer is formed so as to cover the entire surfaces of the fine particles. In the compactification step, the surface layers of the anode substrate are compressed together with the fine metal particles, which allows the dielectric layer formed on the surfaces of the fine particles also to contribute to the capacitance, leading to improved capacitance.

(2) Sintering Step

Thereafter, the anode substrate is sintered. Sintering is preferably performed under reduced pressure. The first portion 2a of the anode wire is implanted from one face of the porous sintered body into its inside.

(3) Step of Obtaining Anode Body (Chemical Conversion Treatment Step)

Next, the anode substrate after sintering is subjected to a chemical conversion treatment, to obtain an anode body 1 being porous and including an anode substrate body and a dielectric layer formed on the surface of the anode substrate body. Specifically, the anode substrate is immersed in a chemical conversion tank filled with an aqueous electrolytic solution (e.g., an aqueous phosphoric acid solution), and the second portion 2b of the anode wire 2 is connected to the anode body in the chemical conversion tank, and in this state, anodization is performed, so that a dielectric layer 3 made of an oxide film of the valve metal can be formed on the surface of the porous portion. As the aqueous electrolytic solution, nitric acid, acetic acid, sulfuric acid, and the like can be used, without limited to an aqueous phosphoric acid solution. The non-anodized core portion of the anode body 1 constitutes the anode substrate body.

(4) Step of Forming Solid Electrolyte Layer

Subsequently, at least part of the dielectric layer 3 is covered with a solid electrolyte layer 4. A capacitor element 10 is thus obtained.

The solid electrolyte layer 4 containing a conductive polymer is formed on at least part of the dielectric layer 3, for example, by a method of impregnating the anode body 1 having the dielectric layer 3 formed thereon with a monomer or an oligomer, and then, polymerizing the monomer or the oligomer by chemical polymerization or electrolysis polymerization, or by impregnating the anode body 1 having the dielectric layer 3 formed thereon with a solution or a dispersion of a conductive polymer, and drying.

The solid electrolyte layer 4 can be formed by, for example, impregnating the anode body 1 having the dielectric layer 3 formed thereon with a dispersion containing a conductive polymer, a binder and a dispersion medium, and then taking it out and drying. The dispersion may contain a binder, and/or conductive inorganic particles (e.g., a conductive carbon material, such as carbon black). Also, the conductive polymer may contain a dopant. The conductive polymer and the dopant may be each selected from those exemplified for the solid electrolyte layer 4. A known binder can be used. The dispersion may contain a known additive used in forming a solid electrolyte layer.

Subsequently, a carbon paste and a metal paste are sequentially applied onto the surface of the solid electrolyte layer 4, to form a cathode layer 5 constituted of a carbon layer 5a and a metal paste layer 5b. The configuration of the cathode layer 5 is not limited thereto, and may be any configuration that has an electric current collecting function.

Next, an anode lead terminal 13 and a cathode lead terminal 14 are prepared. The second portion 2b of the anode wire 2 standing upright from the anode body 1 is joined to the anode lead terminal 13 by laser welding, resistance welding, or the like. On the other hand, after the cathode layer 5 is applied with a conductive adhesive 8, the cathode lead terminal 14 is joined to a cathode section 7 via the conductive adhesive 8.

Subsequently, the capacitor element 10 and materials (e.g., an uncured thermosetting resin and a filler) of a package body 11 are placed in a mold, and the capacitor element 10 is sealed by transfer molding, compression molding, or the like. At this time, the anode lead terminal 13 and the cathode lead terminal 14 are each partly exposed from the mold. The molding conditions are not particularly limited, and the time and the temperature conditions may be set as appropriate, depending on the curing temperature of the thermosetting resin used.

Lastly, the exposed portions of the anode lead terminal 13 and the cathode lead terminal 14 are bent along the package body 11, to form bent portions. In this way, the anode lead terminal 13 and the cathode lead terminal 14 are each partially disposed on the mounting surface of the package body 11.

In the foregoing manner, an electrolytic capacitor 20 is produced.

EXAMPLES

The present invention will be more specifically described below with reference to Examples, but the present invention is not limited to the Examples.

A mixture of valve metal particles (Ta) and binder particles and an anode wire 2 (diameter 0.3 mm) were placed in a mold such that the first portion 2a of the anode wire 2 was embedded in the valve metal particles, followed by pressure-molding, to obtain an anode substrate (0.9 mm by 3.7 mm by 5.2 mm) before sintering having an outer shape of an approximate rectangular parallelepiped.

The anode substrate was fed into a shaker together with alumina particles having an average particle diameter of 0.5 mm. The shaker was operated for a predetermined time, to obtain an anode substrate X1 (Example) whose surface was compactified. In the anode substrate X1, a region (first region) where the density of the surface layer was low and the surface roughness was high was visually confirmed in a circular region (ring-shaped region) at a distance of 0.25 mm or less from the side surface of the anode wire, within the implant face of the anode wire.

With respect to the anode substrate X1 after sintering, the surface roughness (arithmetic mean surface roughness Ra) within the implant face of the anode wire was measured with a laser surface roughness meter. Specifically, 10 points in the first region and 10 points in the region other than the first region (second region) were randomly selected, and the arithmetic mean surface roughness Ra in each region was determined. The surface roughness Ra1 in the first region was in the range of 2.7 to 3.8 μm, and the surface roughness Ra2 in the second region was in the range of 2.4 to 2.9 μm.

In a manner similar to the above, the anode substrate before sintering was put into the shaker together with alumina particles. The shaker was operated for a predetermined time to obtain an anode substrate whose surface was compactified. Alumina particles having an average particle diameter of 1.0 mm, 1.5 mm, and 2.0 mm were respectively used, to obtain a plurality of anode substrates X2 to X4 (Examples). In the anode substrates X2 to X4, a region (first region) where the density of the surface layer was low and the surface roughness was high was visually confirmed in a region at distances of 0.5 mm or less, 0.75 mm or less, and 1.0 mm or less, respectively, from the side surface of the anode wire, excluding the corner portions, within the implant face of the anode wire.

In addition, by tapping the first region of the anode substrate X1 with a ceramic plate so as to be similarly flat to the second region, an anode substrate in which the first region was eliminated was prepared as an anode substrate Y1 (Comparative Example).

The anode substrates X1 to X4 and Y1 after sintering were immersed in an aqueous electrolytic solution, and applied with a voltage via the anode wires, to form dielectric layers. With respect to the anode substrate X1 after chemical conversion, the surface roughness (arithmetic mean surface roughness Ra) within the implant face of the anode wire was measured with a laser surface roughness meter. Specifically, 10 points in the first region and 10 points in the region other than the first region (second region) were randomly selected, and the arithmetic mean surface roughness Ra in each region was determined. The surface roughness Ra1 in the first region was in the range of 2.9 to 4.5 μm, and the surface roughness Ra2 in the second region was in the range of 2.3 to 2.8 μm.

Figure 3:
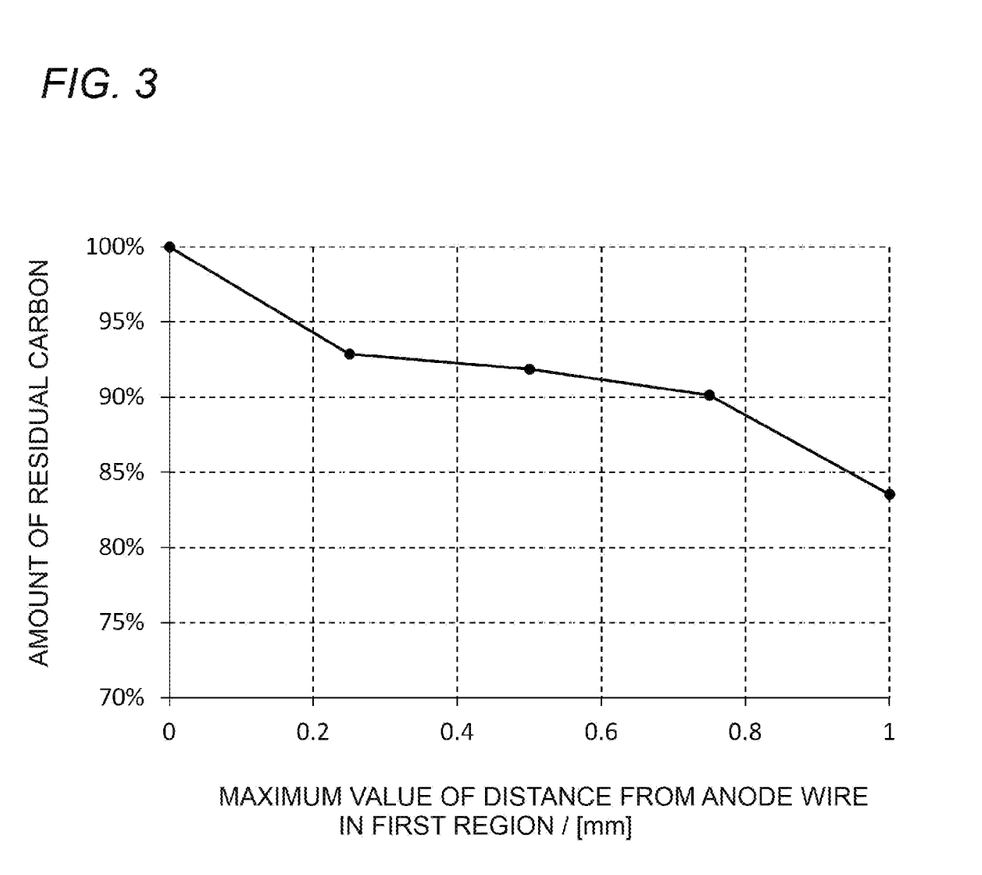
FIG. 3 A graph showing the relationship between the maximum value of a distance from an anode wire in the first region and the amount of residual carbon, in the anode body.

With respect to the anode substrates X1 to X4 and Y1, the elements after sintering were burned using a carbon/sulfur analyzer (manufactured by HORIBA, Ltd.), to derive the amount of residual carbon in the sintering step. The results are shown in FIG. 3 as a relationship of the amount of residual carbon against the maximum value of the distance from the anode wire in the first region. In FIG. 3, the amount of residual carbon is shown by a relative value, with the amount of residual carbon in the anode substrate Y1 not including the first region taken as 100.

FIG. 3 shows that when the first region is provided, the amount of residual carbon is reduced. This can suppress the increase in the leakage current of the electrolytic capacitor.

INDUSTRIAL APPLICABILITY

The present invention is applicable to an electrolytic capacitor, and preferably applicable to an electrolytic capacitor using a porous body as an anode body.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

20: electrolytic capacitor
  10: capacitor element
    1: anode body
    2: anode wire
      2a: first portion
      2b: second portion
    3: dielectric layer
    4: solid electrolyte layer 5: cathode layer
  5a: carbon layer
  5b: metal paste layer
6: anode section
7: cathode section
8: conductive adhesive
11: package body
13: anode lead terminal
14: cathode lead terminal
  14a: joint portion
101A to 101C: principal face of anode body
102A to 102C: connection face
103A: second connection face
111: first region
112: second region

The invention claimed is:

1. An electrolytic capacitor, comprising:
a capacitor element including
an anode body being porous, and including an anode substrate body and a dielectric layer formed on a surface of the anode substrate body, and
a solid electrolyte layer covering at least part of the dielectric layer, wherein:
the anode body has a plurality of principal faces,
a surface of the anode body has a first region and a second region different from the first region, the first region does not include a corner portion where a plurality of the principal faces meet,
a surface roughness Ra1 in the first region is 1.1 times or more greater than a surface roughness Ra2 in the second region, and
at least part of the corner portion has a curved surface shape.

2. The electrolytic capacitor according to claim 1, wherein the first region is a region within one principal face of the anode body, and
the first region is a region at a distance of Dm/2 or less from a center of the one principal face, where Dm is a maximum distance among distances from a plurality of side portions constituting a boundary of the one principal face to the center of the one principal face.

3. The electrolytic capacitor according to claim 1, wherein the second region includes a region within the principal face that has the first region.

4. The electrolytic capacitor according to claim 1, wherein the surface roughness Ra1 is four times or less higher than the surface roughness Ra2.

5. The electrolytic capacitor according to claim 1, further comprising:
an anode wire standing upright from one principal face of the anode body; and
the first region is a region within an implant face from which the anode wire stands upright.

6. The electrolytic capacitor according to claim 5, wherein, within the implant face, a maximum value of a distance from the anode wire in the first region is 0.2 mm or more.

7. The electrolytic capacitor according to claim 1, wherein:
the anode body has a shape of a rectangular parallelepiped, and
the corner portion includes side portions and vertex portions of the rectangular parallelepiped.

* * * * *